Patented Mar. 8, 1932

1,848,806

UNITED STATES PATENT OFFICE

WILLIAM FRED SEYER, OF VANCOUVER, BRITISH COLUMBIA, CANADA

PROCESS FOR THE TREATMENT OF NUTS

No Drawing. Application filed July 6, 1929, Serial No. 376,495, and in Canada June 1, 1929.

My invention relates to improvements in the processes for the treatment of nuts.

It is frequently found that nuts from which the shells have been removed are more or less rancid dependent largely upon the lapse of time since they were shelled and also upon the conditions in which they have been kept. This rancidity is so pronounced at times as to give to the kernels a dark brown colour and render them unfit for human consumption, so that their only value, if any, lies in their oil content. I have discovered that in most nuts the discolouration and rancidity does not penetrate into the meat of the nuts but is found to exist in the form of a thin layer on the outside of the kernel. I have also discovered that this rancidity can be removed and the discolouration overcome by subjecting the kernels to immersion in chemical solutions and subsequent washing and drying, as will be more fully described in the following specification.

I make up a five per cent solution of sodium hydroxide and steep the kernels therein for a period of ten to fifteen minutes varying according to the degree of rancidity to be overcome. Subsequent to the steeping of the kernels in this solution they are washed in several changes of water which removes all excess solution and part of the undesired colour.

The kernels after this treatment sometimes show slight traces of alkali and are of a dark colour. I therefore immerse them in a solution of not more than one per cent of hydrochloric acid for a short time, two minutes usually sufficing, which neutralizes the alkali and reduces the colour to a slight extent.

If it is desired to still further reduce the colour to an amber shade or its natural tint, I steep them in a very weak sulphurous acid solution. The acid for this purpose is reduced until only a faint odour is perceptible and with such a solution the colour is generally reduced to the required shade within about three minutes. The nuts are then washed in several changes of water and are dried in any suitable manner.

What I claim as my invention is:

1. The method of treating rancid nut meats which consists of immersing them in a solution of sodium hydroxide, of washing and drying them.

2. The method of treating rancid nut meats which consists of immersing them in a solution of sodium hydroxide, of subsequently immersing them in a solution of hydrochloric acid, of washing and drying them.

Dated at Vancouver, B. C., this 18th day of June, 1929.

WILLIAM FRED SEYER.